(No Model.)
A. WALES.
SAFETY APPLIANCE FOR GAS DISTRIBUTION.
No. 366,539. Patented July 12, 1887.
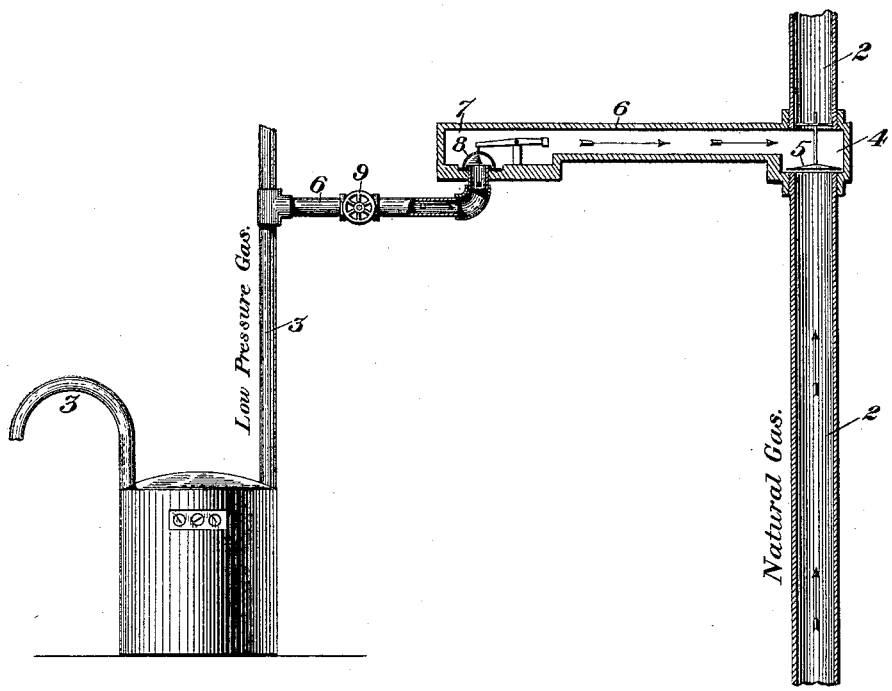

UNITED STATES PATENT OFFICE.

ARTHUR WALES, OF ALLEGHENY CITY, ASSIGNOR TO GEORGE WESTINGHOUSE, JR., OF PITTSBURG, PENNSYLVANIA.

SAFETY APPLIANCE FOR GAS-DISTRIBUTION.

SPECIFICATION forming part of Letters Patent No. 366,539, dated July 12, 1887.

Application filed December 31, 1886. Serial No. 223,034. (No model.)

*To all whom it may concern:*

Be it known that I, ARTHUR WALES, of Allegheny City, in the county of Allegheny and State of Pennsylvania, have invented a new and useful Improvement in Safety Appliances for Gas-Distribution; and I do hereby declare the following to be a full, clear, and exact description thereof.

In the distribution of natural gas it often happens that, by reason of uncertainty in the supply and consumption, the pressure of gas fluctuates, and sometimes sinks so low that the gas goes out at the burners. This is objectionable, not only because of the loss of the fuel, but also because of the fact that when the gas-pressure again rises the gas is apt to escape through the burners unconsumed. This may be the cause of serious accidents, especially in dwelling-houses.

It is the object of my invention to provide means for overcoming this difficulty in the use of natural gas; and to that end it consists in connecting with the natural-gas supply pipe a branch from the supply-pipe of an illuminating gas system or a branch pipe from some other gas system in which the gas is at a lower pressure than the pressure of the natural gas, and providing the auxiliary lower-pressure pipe with a valve which is so arranged that it shall be closed when the pressure of the natural gas is at the desired degree, and that when the pressure of the natural gas falls the valve shall be opened to admit a supply of gas from the auxiliary branch pipe.

The accompanying drawing shows a vertical sectional view of apparatus embodying my invention.

In the drawing, 2 represent the supply-pipe of a natural gas system, which leads to the burners, and 3 is the illuminating-gas-supply pipe. In the pipe 2 is a valve-chamber, 4, in which is arranged a valve, 5, which may be a puppet-valve, as shown in the drawing, but which may be any other convenient form of valve adapted to be opened by the pressure of the gas in the direction of the arrows and to be closed by back-pressure thereon.

6 is a branch pipe leading from the pipe 3 and entering the pipe 2 in advance of the valve 5. In the pipe 6 is a valve-chamber, 7, in which is a valve, 8, controlling the pipe, and, like the valve 5, adapted to be opened by the forward flow of gas through the pipe 6 and to be closed by back-pressure. This valve may be of any ordinary construction suitable for this end. The valves are preferably made very easy in their movements, so that they shall offer but little resistance to the gas flow.

Suppose, now, that the normal pressure of gas in the pipe 3 is, for example, about one quarter of an ounce, and that the normal pressure of the natural gas in the pipe 2 is higher than that in the pipe 3. Then so long as the pressure of the natural gas is greater than one-quarter of an ounce the flow of gas through the pipe 2 will keep the valve 5 open and its back-pressure on the valve 8 will keep it closed, thus excluding the low-pressure gas in the pipe 3 from entering the supply-pipe 2. If, however, the pressure of gas in the pipe 2 should diminish to a point below that of the illuminating-gas, the pressure of the latter on the rear of the valve 8 will overcome the back-pressure of the natural gas thereon and will open this valve, thus permitting the illuminating-gas to flow through the pipe 6 into the pipe 2 to the burners, and at the same time the excess of pressure on the front of the valve 5 over the pressure on its rear face will close it, and will thus cut off any possible waste of the illuminating-gas back through the natural-gas pipes. As soon as the natural-gas pressure again rises to a point above that of the illuminating-gas the excess of pressure on the rear of the valve 5 will open it, and at the same time the valve 8 will be closed, so as to cut off the illuminating-gas, re-establishing the flow of natural gas to the burners. In this way it will be seen that a continual supply of gas to the burner is maintained, for whenever the natural gas fails there is an immediate supply of illuminating-gas to take its place. Danger from extinguishment of the flame is thus prevented, and the facts that the operation of the device is automatic and that the illuminating-gas is not allowed to flow until the cessation of the natural-gas flow make the apparatus simple and efficient and very economical.

Any desired degree of diminution of pressure of the natural gas required to allow the valve 8 to rise may be determined by proportionally weighting the two valves.

The use of the valve 5 is not absolutely necessary to the practice of my invention, though it is very desirable, because it prevents wasting of the illuminating-gas back through the pipe 2, and the apparatus would be defective without it.

If desired, the connection of the illuminating-gas system may be adapted to be cut off by placing a hand-valve, 9, at a suitable place in the pipe 6.

I claim—

1. In a system of gas-distribution, the combination of a main gas-supply pipe, an auxiliary supply-pipe communicating with the main pipe and containing gas whose pressure is less than the normal pressure in the main pipe, and a valve controlling said auxiliary pipe, said valve being movable by the gas-pressure, and so arranged that the pressure of gas in the auxiliary pipe shall tend to open it and that the pressure of gas in the main pipe shall tend to close it, whereby on the excess of pressure in the auxiliary pipe over the resistance against such pressure the valve shall open and admit gas to the main pipe, substantially as and for the purposes described.

2. In a system of gas-distribution, the combination of a main gas-supply pipe, an auxiliary supply-pipe communicating with the main pipe and containing gas whose pressure is less than the normal pressure in the main pipe, a valve controlling said auxiliary pipe, said valve being movable by the gas-pressure, and so arranged that the pressure of gas in the auxiliary pipe shall tend to open it and that the pressure of gas in the main pipe shall tend to close it, whereby on the excess of pressure in the auxiliary pipe over the resistance against such pressure the valve shall open and admit gas to the main pipe, and a valve controlling the main pipe and adapted to be opened by forward pressure of gas therein, substantially as and for the purposes described.

3. The combination of a main gas-supply pipe, 2, a valve, 5, controlling said pipe, an auxiliary gas-pipe, 3, communicating with the pipe 2 in advance of the valve 5, and a valve, 8, controlling the pipe 3, substantially as and for the purposes described.

In testimony whereof I have hereunto set my hand this 24th day of December, A. D. 1886.

ARTHUR WALES.

Witnesses:
  W. B. CORWIN,
  THOMAS W. BAKEWELL.